United States Patent [19]

Bloomer

[11] Patent Number: 4,567,425
[45] Date of Patent: Jan. 28, 1986

[54] METHOD OF AND APPARATUS FOR HALF-CYCLE-AVERAGE OR R.M.S. LOAD VOLTAGE CONTROL

[75] Inventor: Milton D. Bloomer, Scotia, N.Y.

[73] Assignee: General Electric Company, Schenectady, N.Y.

[21] Appl. No.: 561,494

[22] Filed: Dec. 14, 1983

[51] Int. Cl.$^4$ ............................................. G05F 1/44
[52] U.S. Cl. ................................... 323/237; 323/235
[58] Field of Search ............... 323/235, 237, 238, 239, 323/241–244, 246, 270, 300, 319, 326; 307/252 N, 252 Q, 252 UA

[56] References Cited

U.S. PATENT DOCUMENTS

| | | | |
|---|---|---|---|
| 3,501,771 | 3/1970 | Miller et al. | 323/242 |
| 3,564,394 | 2/1971 | Opal et al. | 323/235 |
| 3,790,863 | 2/1974 | Cross, Jr. | 307/252 UA |
| 4,051,425 | 9/1977 | Smith | 323/237 |
| 4,461,990 | 7/1984 | Bloomer | 323/235 |
| 4,528,494 | 7/1985 | Bloomer | 323/235 |

Primary Examiner—Patrick Salce
Assistant Examiner—D. L. Rebsch
Attorney, Agent, or Firm—Geoffrey H. Krauss; James C. Davis, Jr.; Marvin Snyder

[57] ABSTRACT

A sample of the voltage magnitude across a load, connected in series with an A.C. source and a load-current-flow-control subcircuit, is taken during at one of the time intervals when load current flows during a source waveform cycle. The sampled load voltage is compared to a reference level and the difference in magnitude between the sampled and reference voltages is integrated, with respect to time, to provide an adjustment signal. The adjustment signal is provided to a subcircuit for timing the conduction period of the load-current-flow-control subcircuit, by varying the conduction-termination time after each conduction-commencement (at each source waveform zero-crossing) to vary the selected one of the half-cycle-average (mean absolute deviation—MAD) or RMS voltage magnitude across the load to a value such that the sampled load voltage magnitude is substantially equal to the selected reference voltage magnitude. Several presently preferred embodiments are described for controlling the load magnitude in accordance with this method.

24 Claims, 12 Drawing Figures

METHOD OF AND APPARATUS FOR HALF-CYCLE-AVERAGE OR R.M.S. LOAD VOLTAGE CONTROL

BACKGROUND OF THE INVENTION

The present invention relates to load power switching circuits and, more particularly, to a novel method of, and apparatus for, controlling a selected one of the average or R.M.S. magnitude of A.C. voltage across a load.

It is known to control the magnitude of a current flowing through a load from an A.C. source by means of a phase-control circuit, utilizing either forward-phase control or reverse-phase control (the latter as described and claimed in my co-pending application Ser. No. 529,296, filed on Sept. 6, 1983, now U.S. Pat. No. 4,528,494 assigned to the assignee of the present application and incorporated herein in its entirety by reference). In many uses, open-loop control of the load voltage magnitude, and therefore of the load power, is adequate. In many other uses, e.g. a line voltage converter for energizing lower voltage incandescent lamps, closed-loop control of the load (lamp) voltage magnitude, and therefore of the load power, is desirable. It is also desirable that any load voltage magnitude control method and apparatus, whether controlling the "average", i.e. mean absolute deviation (MAD), or root-mean-square (RMS) magnitude, be utilizable with any switched-voltage or phase-control (whether forward-control or reverse-control) voltage converter and also be equally as well suited for use with power switching devices, placed in series between the controlled load and an A.C. source, of regenerative or controlled-turn-off types. It is also highly desirable that any load voltage magnitude control apparatus be capable of operating in conjunction with load current control means, such as the reverse-phase load current control means of the aforementioned co-pending application, which provides load control during the high "inrush" current magnitude initial interval when a "cold" load is first energized.

BRIEF SUMMARY OF THE INVENTION

In accordance with the invention, a load voltage sampling means is provided for sampling the magnitude of the voltage across the load during at least one of the time intervals when load current flows during a source waveform cycle. The sampled load voltage is compared to a reference level and the difference in magnitude between the sampled and reference voltages is integrated, with respect to time, to provide an adjustment signal. The adjustment signal is provided to means for timing the conduction period of power switching means, in series connection between the controlled load and an A.C. source, by varying the conduction determination time after each conduction-commencement (at each source waveform zero crossing) to vary the selected one of the average (MAD) or RMS voltage magnitude across the load to a value such that the sampled load voltage magnitude is substantially equal to the selected reference voltage magnitude.

In presently preferred embodiments, the sampling means can be configured for MAD or RMS magnitude control by the deletion or addition of substantially one properly-selected passive component, e.g. a single resistance element. The sampling means is active only during the positive-polarity source waveform period of load current conduction for the MAD magnitude control embodiment and is active until the end of the negative polarity source waveform period of load current conduction for the RMS magnitude control embodiment. A portion of the reduced-amplitude source voltage waveform is thus used in the RMS sampling means to provide additional information as to source magnitude, for controlling the more-rapid changes in RMS load magnitude with a change in source magnitude. The power switching means can be configured with any form of power switching device(s) and the controlling timing means can be configured to terminate load current conduction after a maximum interval, set by a turn-off setting means in default of a load-voltage-controlled turn-off and/or immediately if a load current greater than a predetermined magnitude (and potentially harmful to the load and/or power switching means) is flowing.

Accordingly, it is an object of the present invention to provide a novel method for controlling the magnitude of the MAD or RMS voltage across a load connected in series with an A.C. source.

It is another object of the present invention to provide novel apparatus for controlling either the MAD or RMS magnitude of the voltage across a load connected in series with an A.C. source.

These and other objects of the present invention will become apparent upon consideration of the following detailed description, when read in conjunction with the drawings.

DETAILED DESCRIPTION OF THE INVENTION

Figure 1:
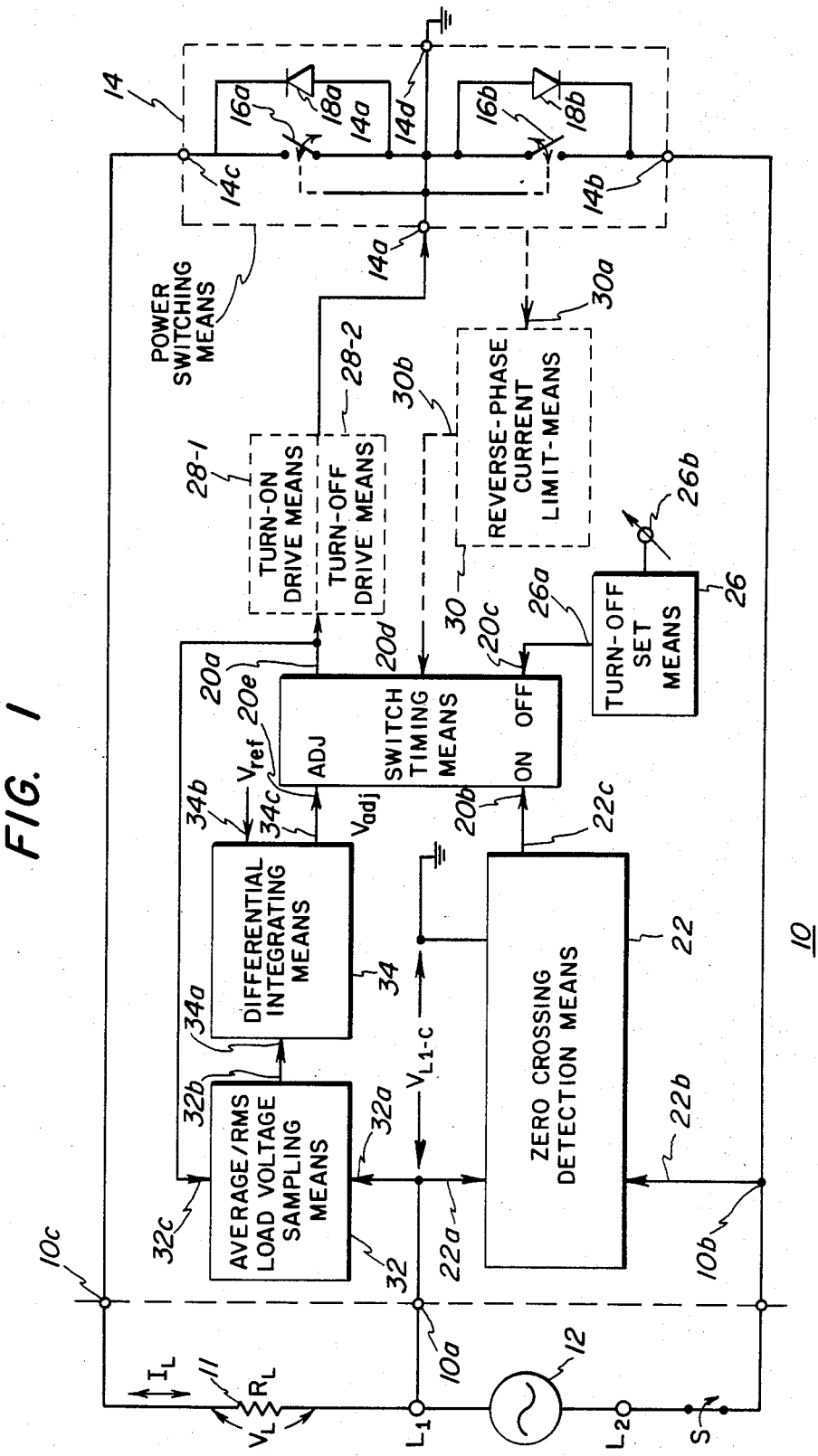
FIG. 1 is a schematic block diagram of a load voltage magnitude control apparatus in accordance with the principles of the present invention.

Referring initially to FIGS. 1 and 1a–1c, a load voltage magnitude control apparatus 10 is connected, by closure of a switch S, in series with a load resistance 11, of nominal load resistance magnitude $R_L$, across an A.C. source 12. The source voltage is available at first and second line terminals $L_1$ and $L_2$, respectively connected to first and second control apparatus input terminals 10a and 10b. Resistive load 11 is connected between one of the source line terminals, e.g. terminal $L_1$, and another terminal $10c$ of control circuit means 10. Load 11 typically requires an average or RMS voltage $V_L$, i.e. the voltage between terminals $10a$ and $10c$, less than the source line-to-line voltage $V_{L1-L2}$, between terminals $10a$ and $10b$. The source line-to-line voltage $V_{L1-L2}$ is typically a sinusoidal voltage waveform (FIG. 1a) having, in the United States, a frequency of about 60 Hz. and a peak value $V_p$ of about 163 peak volts for the standard 115 volts RMS potential utilized for most residential and small business branch circuits. An illustrative resistive load 11 might be a low-voltage incandescent lamp, requiring an average/RMS load voltage $V_L$ magnitude of about 30 volts. Voltage magnitude control apparatus 10 must therefore operate to control the average/RMS load voltage to a magnitude less than that of source 12.

Load voltage control means 10 includes a power switching means 14 having an input control terminal $14a$ for controlling the connection of load-connection terminals $14b$ and $14c$ to each other and to a circuit common potential at a power switching means terminal $14d$. Power switching means terminals $14b$ and $14c$ are respectively individually connected to the associated one of the second line L2 terminal $10b$ and the load connection terminal $10c$. Power switching means 14 includes first and second switching means $16a$ and $16b$ having primary current-conduction circuits controllable by the signal at control input $14a$ for connecting the respective one of terminals $14c$ or $14b$ to circuit common terminal $14d$. Power switching means 14 also includes a pair of unidirectionally-conducting devices $18a$ and $18b$, each connected in parallel across the primary conduction circuit of the associated one of the respective controlled switching devices $16a$ and $16b$, and poled so as to allow current flow from common potential terminal $14d$ to the associated one of main conduction terminals $14c$ or $14b$, respectively. It should be understood that switching devices $16a$ and $16d$ may be selected from a wide range of regenerative and controlled turn-off devices, many of which devices, such as insulated gate transistors (IGTs) (sometimes also known as insulated gate rectifiers (IGRs), power MOSFETs and the like), have a reverse-poled diode 18 formed across their controlled-conduction circuits as a parasitic element. Thus, in general, power switching means 14 may consist of a pair of power switching devices rated to continuously operate with the average voltages and currents and to withstand the peak voltages and currents, for the particular load, and having operational characteristics commensurate with the additional operating details described hereinbelow.

The power switching means control signal, at input $14a$, is established such that one of switching means $16a$ or $16b$ conducts for only a portion of an associated half-cycle of the source 12 waveform. The time at which one or the other of switching devices $16a$ or $16b$ is turned "on" to the current-conductive, and the time at which that conductive device is turned "off" to the current non-conductive condition, are controlled by the signal at the output $20a$ of a switch timing means 20. Advantageously, switch timing means 20 enables output $20a$ responsive to receipt of an "on" enabling signal at a first ON input $20b$ and disables the signal output $20a$ responsive to an "off" enabling signal at a second OFF input $20c$. A zero-crossing detection means 22 has first and second inputs $20a$ and $20b$ respectively connected to the load control apparatus input terminals $10a$ and $10b$ (and thence to source line terminals $L_1$ and $L_2$, respectively for providing an output pulse at a detection means output $22c$ responsive to each source voltage waveform zero crossing, occurring at points $24a$–$24g$ of source voltage waveform $V_{L1-L2}$ waveform 24 of FIG. 1a. Each zero-crossing pulse at detection means output $22c$ is coupled to the first ON input $20b$ of switch timing means 20. A turn-off set means 26 provides a signal at an output $26a$ for coupling to the second OFF input $20c$ of the switch timing means, which turn-off setting signal may be adjusted, by means of an associated control $26b$, to occur at some nominal time after the occurrence of each "on" pulse at first switch time means input $20b$. The effect of detection means 22 and turn-off set means 26, in conjunction with switch timing means 20, is to enable timing means output $20a$ at each source waveform zero crossing and disable output $20a$ at some time thereafter, and prior to the next subsequent source waveform zero-crossing. Dependent upon the particular power switching devices 16 used, the signal at switch timing means output $20a$ may be operated upon by turn-on drive means $28a$ and/or turn-off drive means $28b$ for providing the proper control signal voltage/current characteristics at power switching means control input terminal $14a$. If desired, the load maximum "inrush" current may be limited, or the power switching devices protected from over-dissipation, by a current limit means 30, having at least one input $30a$ connected to power switching means 14 and having an output $30b$ connected to an auxiliary turn-off input $20d$ of the switch timing means. In particular, where power switching means 14 utilizes semiconductor switching devices 16 of a type which should remain saturated during current-conduction time intervals, means 30 may be the reverse-phase current control means of the aforementioned co-pending application, serving to turn off (disable) switch timing means output $20a$ if the involved one of the switching devices 16 is removed from saturation. While described hereinbelow in some detail, turn-on and turn-off drive means $28a$ and $28b$ are described and claimed in greater detail in my co-pending application Ser. No. 499,579, filed May 31, 1983, and switch timing means 20, zero-crossing detection means 22 and turn-off set means 26 are all described and claimed in greater detail in the aforementioned application Ser. No. 529,296. It should be understood that other embodiments of each of these means, different from those particularly described in each of the aforementioned applications (which are incorporated herein in their entireties by reference), can be utilized.

In accordance with the invention, a load voltage sampling means 32 has an input $32a$ coupled through apparatus input terminal $10a$ to the line $L_1$ terminal of the load, to allow a sample of the line 1-to-circuit common potential $V_{L1-C}$ to be provided at an output $32b$ responsive to a sample control signal at a control input $32c$. The "average" (mean absolute deviation, or MAD) or the root-mean-square (RMS) value of the load voltage sampled by means 32 is provided as the output $32b$ signal and is coupled to a load voltage sample input $34a$ of a differential integrating means 34. A reference potential $V_{ref}$ is provided to a second input $34b$ of the differential integrating means. The signal at an output $34c$ thereof, varying as the integral, with time, of the difference between the sample voltage $V_s$ and the reference voltage $V_{ref}$, is provided as an adjustment voltage $V_{adj}$ to an adjustment input $20e$ of switch timing means 20.

As long as the load voltage sample signal at sampling means output 22c is equal in magnitude to the reference voltage magnitude at integrating means input 34b, the adjustment voltage provided to switch timing means input 20e does not affect the turning on and off of power switching means 14. If means 32 samples a load voltage less than the desired magnitude, which desired magnitude is set by the magnitude of the reference voltage at integrating means input 34b, the magnitude of the adjustment voltage at switching means input 20c increases, causing the switch timing means output 20a signal to be enabled (if all other turn-off factors, such as those as set by means 26 and/or 30, if used, have not changed) for a longer time interval to increase the actual load voltage. Conversely, if load voltage sampling means 32 senses a load voltage greater than the desired value set by the reference voltage at integrating means input 34b, the magnitude of the adjustment voltage at switch timing means input 20e decreases, to decrease the time interval during which switch timing means output 20a is enabled (all other turn-off factors being unchanged) and causes power switching means 14 to break the current-conduction path after a shorter time interval, reducing the MAD/RMS magnitude of the voltage across load 11.

Figure 1A:
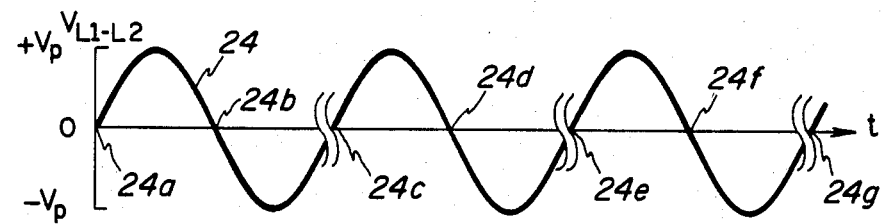
FIGS. 1a–1d are a set of time-coordinated graphs illustrating the waveforms occurring in the circuit of FIG. 1 for various conditions of interest, and useful in understanding principles of operation of the present invention.
Figure 1B:
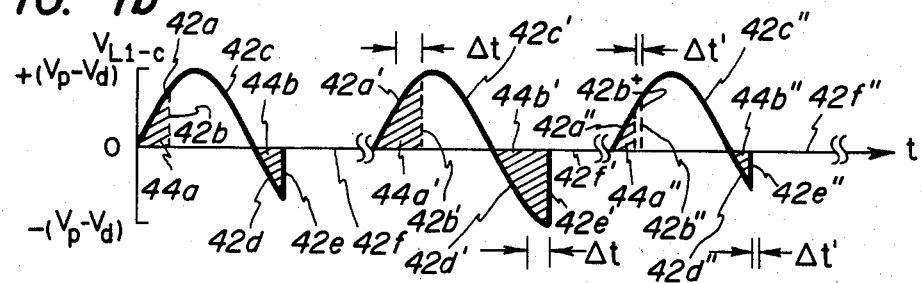
Figure 1C:
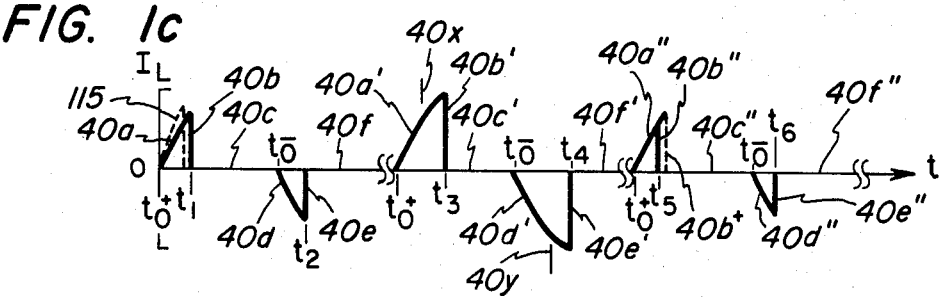

This operational sequence is illustrated for the "average" (MAD) operation in FIGS. 1b and 1c. In the desired load average voltage case (illustrated in the leftmost waveforms), the zero crossing, e.g. a positive-going zero-crossing 24a in FIG. 1a, is detected by means 22 and causes upper switching device 16a to be closed at the beginning of the positive-polarity half-cycle of the source waveform. Thus, line terminal $L_1$ is positive with respect to line terminal L2, and diode 18b conducts, such that line terminal $L_2$ is substantially at circuit common potential (assuming that the forward-conduction voltage drop of diodes 18 is much less than the peak magnitude of the source 12 voltage, as in the illustrated case). As the positive voltage at line terminal $L_1$ increases, the load current $I_L$ flows from terminal $L_1$, through load 11, into terminal 10c and thence through closed switching device 16a and forward-biased diode 18b, to the remaining line terminal $L_2$. The load current $I_L$ (FIG. 1c) has a sinusoidally-increasing waveform portion 40a. At some turn-off time $t_1$ after the initial positive-going zero crossing turn-on time $t_0{}^+$ (which turn-off time is normally established, in the steady-state operation, by turn-off set means 26), the switch timing means output 20a signal is disabled and upper switching means 16a is caused to open, whereby load current abruptly falls, as in load current $I_L$ waveform portion 40b. The load current remains at essentially zero magnitude during that portion 40c remaining of the positive-polarity source waveform half-cycle. The voltage $V_{L1\text{-}C}$, between line terminal $L_1$ and the circuit common, has also sinusoidally increased during a first portion 42a (FIG. 1b) while the load current was present. Even after load current flow is terminated at time $t_1$, the load terminal 1-to-common voltage does not abruptly terminate, as would be shown by broken line 42b', but continues to follow the sinusoidal source voltage 24 waveform, as shown in line 1-common waveform portion 42c, until the next, negative-going zero crossing at time $t_0{}^-$. At this next, negative-going zero crossing 24b (FIG. 1a), switch timing means input 20b receives another zero-crossing pulse and again enables output 20a to turn on the appropriate one of switching devices 16, i.e. lower switching device 16b. During the negative-polarity source waveform half-cycle, second line terminal $L_2$ is positive with respect to first line terminal $L_1$, whereby upper diode 18a is forward biased and control apparatus terminal 10c is substantially at common potential. Load current $I_L$ flows from line terminal $L_2$, through closed switching means 16b and forward-biased diode 18a, through load 11 to load terminal $L_1$, with a sinusoidal negatively-increasing portion 40d (FIG. 1c). At some time $t_2$ thereafter, determined by turn-off set means 26, the switch timing means output 20a is disabled, causing lower switching means 16b to open and load current to abruptly terminate, as shown by load current $I_L$ portion 40e, to a substantially zero magnitude and to remain at the substantially zero magnitude, as in portion 40f, until the next zero-crossing enablement of power switching means 14. Simultaneously, the voltage $V_L$ across the load substantially follows the line 1-to-common $V_{L1\text{-}C}$ voltage and commences to sinusoidally increase in the negative direction, as in waveform portion 42d. When lower switching device 16b is opened and current flow terminated, the load voltage $V_L = R_L \times I_L$ falls substantially to zero (portion 42e); as the voltage at terminal 10c is still one diode drop below circuit common potential, the voltage at line terminal $L_1$ is forced to the terminal 10c voltage and thus abruptly decreases, at portion 42c, such that the line 1-to-common voltage $V_{L1\text{-}C}$ remains at a substantially zero magnitude, as at portion 42f, for the remainder of the negative polarity source waveform half-cycle. Thus, the average load voltage is related to the sum of the areas 44a and 44b under the voltage waveform portions 42a and 42d, respectively; integration of the line 1-to-common voltage $V_{L1\text{-}C}$ from time $t_0{}^+$ to time $t_1$ and from time $t_0{}^-$ to time $t_2$ provides the MAD load voltage magnitude. Since the turn-off times $t_1$ and $t_2$ are, in this normal operational case, controlled by means 26 to be substantially equal, any integration of the areas thereunder would, over a full cycle, average to zero and require an integrator having an output capable of excursions in both the positive- and negative-polarity directions. To simplify the circuit, e.g. for only positive-polarity integrator means 34 output voltages, it will be seen that the curved portions 42a and 42d are substantially symmetrical and areas 44a and 44b are substantially equal, whereby only one of the areas, i.e. the area 44a during the positive-polarity source waveform half-cycle and when upper switching device 16a is conducting, is integrated to determine the MAD load voltage magnitude. A positive-polarity reference voltage at input 34b can now be made equal to the desired sampling means output 32c average voltage, and the time integral of the difference between the output 32 sampled voltage and the reference voltage is of substantially zero magnitude, whereby the adjustment voltage at output 34c is also of a substantially fixed magnitude; no change in this magnitude occurs as long as the MAD load voltage magnitude remains constant and no change in the disablement timing of switch timing means output 20a occurs.

In the case illustrated by the middle set of waveforms, the times $t_3$ and $t_4$ after their respective positive zero crossing time $t_0{}^+$ and the respective negative-going zero crossing time $t_0{}^-$, are greater than the respective times $t_1$ and $t_2$ in the desired load voltage (left-hand) case. The sinusoidally-increasing positive-polarity and negative-polarity waveform portions 40a' and 40d' exist for a longer time interval, whereby the peak load current $I_L$ is greater than in the desired-voltage case and the peak voltage at the end of the associated voltage waveform portions 42a' and 42d' is also greater than the peak voltage at the end of the current-conduction intervals in the desired-voltage case. Therefore, the equal areas 44a' and 44b' under the voltage curve are greater, and the positive-polarity half-cycle integrated area 44a' will, after comparison to the reference voltage set for the desired load voltage MAD magnitude and subsequent integration, provide an adjustment voltage $V_{adj}$ at integrating means output 34c and switch timing means input 20e of a magnitude less than the adjustment voltage magnitude provided for the case where the sampled average load voltage is equal to the reference voltage, as previously described. This decreased voltage at input 20e decreases the time, after the time at which a zero-crossing pulse appears at first ON input 20b at which output 20a is disabled, by operating in conjunction with turn-off set means 26, but independently from a turn-off signal from current limit means 30, which means 30 turn-off signal can occur earlier or later than the turn-off signal from means 32, 34 and 26 in that source waveform cycle. Means 32 and 34 operate to cause, in the next source waveform cycle, the switch timing means to turn off the load current at times indicated by mark 40x (for the positive-polarity half-cycle) and mark 40y (for the negative-polarity half-cycle), to reduce the time (during which load current flows and voltage is present across the load) by a factor $\Delta t$, and thus reduce the MAD load voltage magnitude. If the reduction $\Delta t$ of load current conduction time is insufficiently large, the integrated difference between the load voltage sample and the reference voltage, in a next subsequent source waveform cycle, will change the adjustment voltage at switch timing means input 22d to effect a greater reduction of current conduction time, further reducing the load voltage MAD magnitude, and will continue to reduce this magnitude in subsequent cycles until the sampled MAD load voltage magnitude at integrating means input 34a is equal to the reference voltage magnitude at input 34b.

Similarly, as shown in the right-hand portions of FIGS. 1b and 1c, if the load current turns off at respective times $t_5$ and $t_6$, less than the required times $t_1$ and $t_2$ after the respective positive-going and negative-going zero-crossing times $t_0^+$ and $t_0^-$, respectively, the load current portions 40a'' and 40d'' will attain a lesser magnitude, as will the sampled voltage magnitude portions 42a'' and 42d'', resulting in decreased areas 44a'' and 44b'' thereunder. The sampled positive-polarity source waveform half-cycle voltage portion 42a'', when compared against the reference voltage and integrated, provides a increased value of adjustment voltage $V_{adj}$ at switch timing means input 20e, which is greater than the nominal value thereof, causing the turn-off set means 26 to keep switch timing means output 20a, during the next subsequent source waveform cycle, enabled for an additional time $\Delta t'$ after the times $t_5$ and $t_6$, at which turn-off set means 26 would have commanded disablement of timing means output 20a if the adjustment $V_{adj}$ voltage were at the nominal value. Thus, current continues to flow during an additional part of portion 42c'' until turn-off at portion 40b+ and the load voltage sample continues until the time $(t_5 + \Delta t')$ ending at broken line portion 42b+. The load voltage MAD magnitude thus increases and will continue to increase in subsequent source waveform cycles, until the sampled voltage is substantially equal to the reference voltage and the adjustment voltage ceases to change.

In the foregoing manner, the load voltage MAD magnitude is controlled to an "average" value established by the reference voltage $V_{ref}$ magnitude provided at differential integrating means input 34b.

Figure 2:
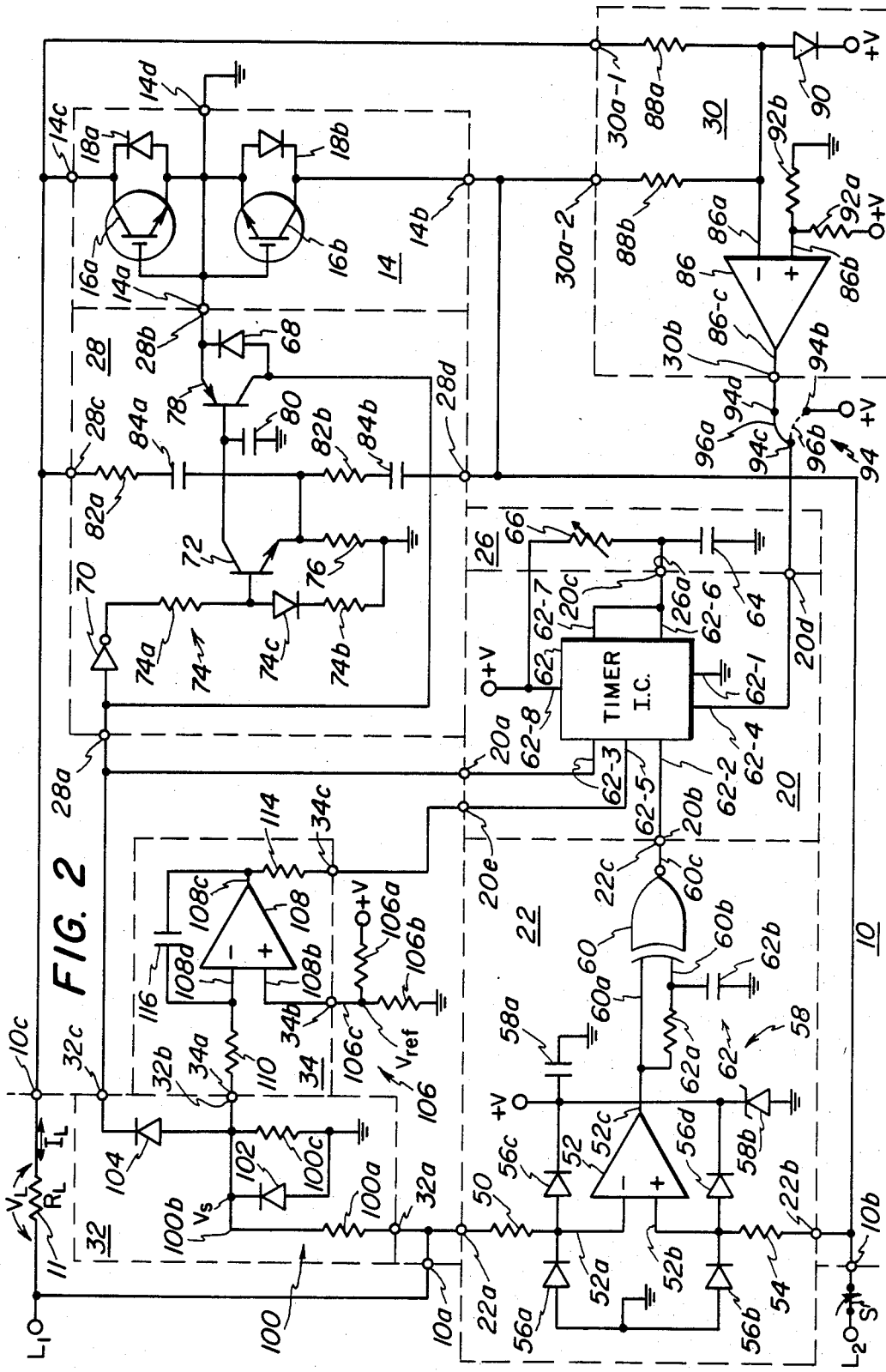
FIG. 2 is a schematic diagram of a first presently preferred embodiment of the apparatus of the present invention, and particularly adapted for controlling the MAD load voltage magnitude.
Figure 3:
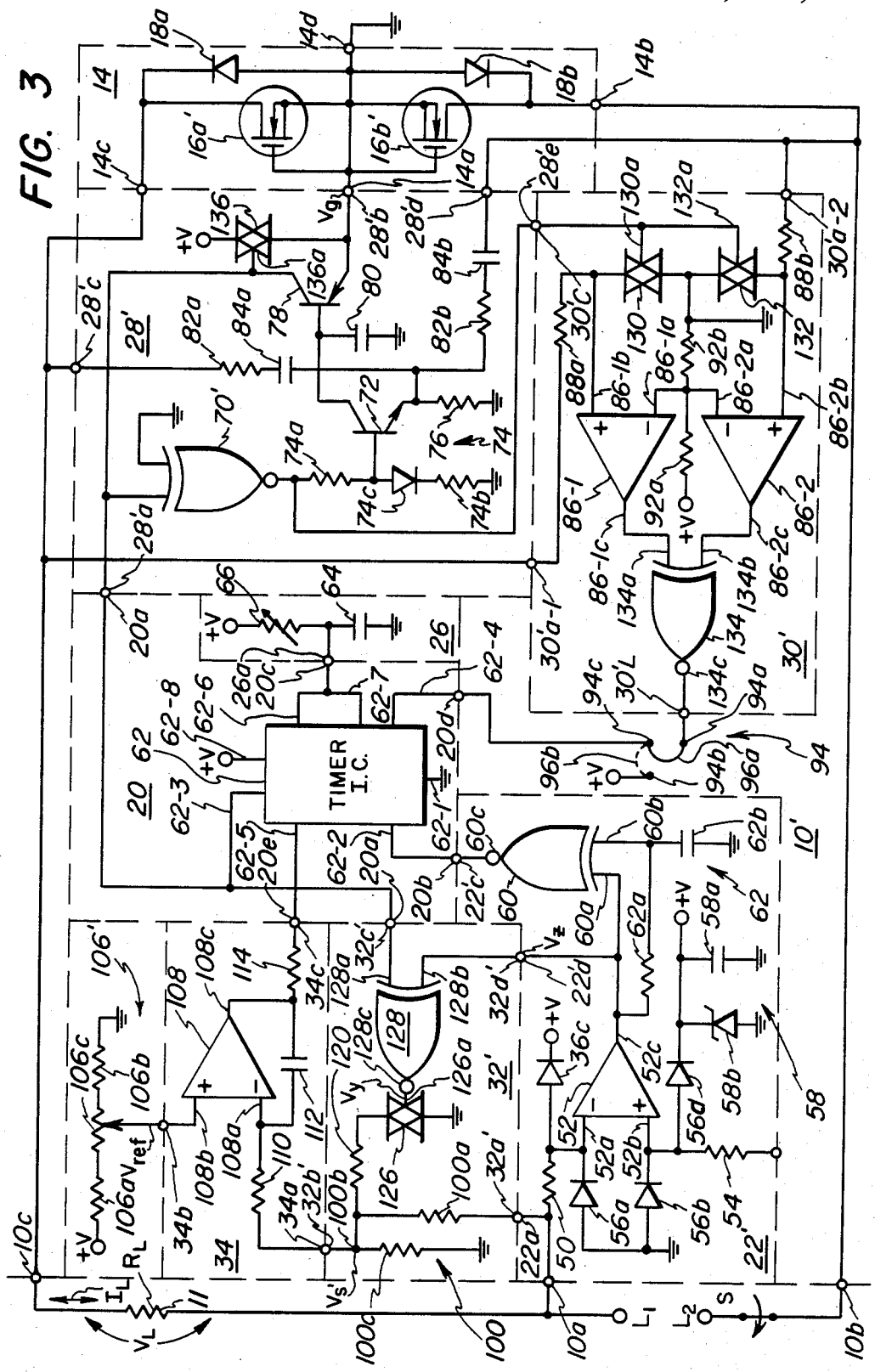
FIG. 3 is a schematic diagram of another presently preferred embodiment of the apparatus of the present application, and particularly adapted for controlling the RMS magnitude of load voltage.
Figure 3A:
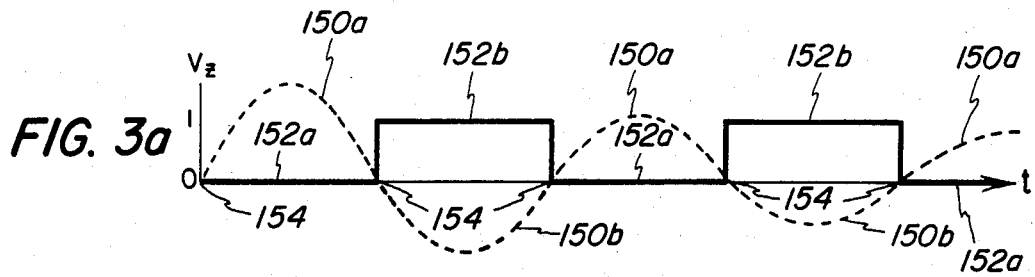
FIGS. 3a–3d are a set of time-coordinated graphs of several waveforms observable in the circuit of FIG. 3, and useful in understanding principles of operation thereof.
Figure 3B:
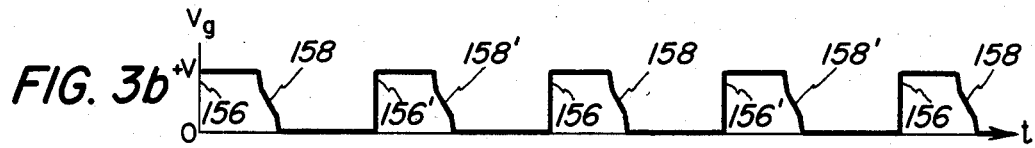
Figure 3C:
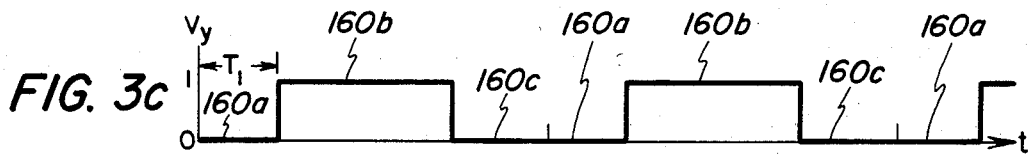
Figure 3D:
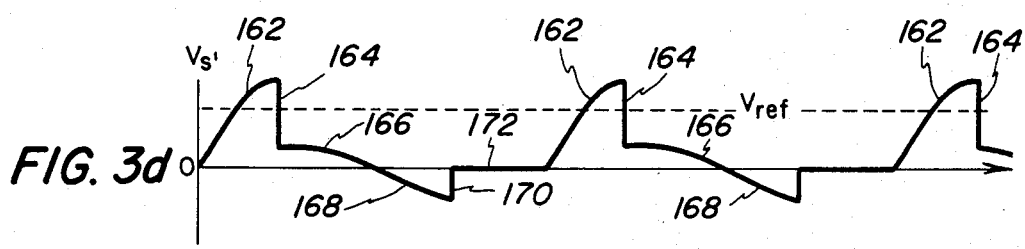

A presently preferred embodiment of apparatus 10 for controlling the load voltage MAD magnitude is illustrated in FIG. 2. A number of different embodiments for power switching means 14 are possible: power field-effect transistors (44), e.g. as illustrated in FIG. 3; power bipolar transistors; insulated-gate rectifiers (IGRs); insulated-gate transistors (IGTs), e.g. as illustrated in FIG. 2, and like controlled-turn-off devices can be utilized. In the illustrated embodiments, utilizing a reverse-phase control scheme for purposes of illustration only, power switching means 14 can be provided by any means capable of being turned on to conduct an A.C. current and subsequently being turned off, to cease conduction of that current, with a non-zero voltage across that means and with a non-zero current flowing to that means. Thus, as illustrated in FIG. 2, power switching means 14 may comprise a pair of IGTs 16a and 16b, having the collector-emitter, current-conduction channels thereof connected in series between switching means terminals 14b and 14c, and with the control (gate) electrodes thereof connected in parallel to control input 14a. Each of the IGT source electrodes is connected to circuit common terminal 14d, as are the anodes of the reverse conduction diodes 18a and 18b connected in parallel with the controlled current-conduction channels of each associated one of devices 16a and 16b.

Zero-crossing detector means 22 is utilized in the embodiments of both FIGS. 2 and 3. The first detector input 22a is connected through a limiting series resistance 50 to the non-inverting + input 52a of a first comparator 52. The second zero-crossing detector input 22b is connected to another limiting resistance 54 to an inverting − input 52b of the comparator. First and second protection diodes 56a and 56b each have their anodes connected to the circuit common potential and their cathodes are connected to the associated one of comparator inputs 52a and 52b. A second pair of protection diodes 56c and 56d each have the cathodes thereof connected to a positive operating potential $+V$ and have their respective anodes each connected to an associated one of comparator inputs 52a and 52b. The operating potential $+V$ is derived from a source 58 which includes a capacitance 58a parallelled by a zener diode 58b, having a zener voltage of $+V$ volts; when input terminal $L_2$ is positive with respect to circuit common, and of a magnitude somewhat greater than $+V$ volts, current flows through resistance 54 and forward-biased diode 56d, to charge capacitance 46 to the $+V$ maximum voltage set by zener diode 48. Similarly, when terminal $L_1$ is positive with respect to circuit common, current flows through resistance 50 and diode 56c to also charge capacitor 47.

At each zero crossing of the voltage between terminals $L_1$ and $L_2$, the voltage at a first comparator output 56c abruptly changes amplitude. This amplitude change is directly coupled to a first input 60a of an exclusive-NOR gate 60, receiving a delayed version of the amplitude change in its remaining input 60b, by action of a delay circuit 62 (itself including a series resistance 62a and a shunt capacitance 62b). Thus, for every input voltage waveform zero crossing, the gate 60 inputs 60a and 60b are at different amplitudes for a short time, dependent upon the delay introduced by delay means 62, and the gate output 60c changes from a higher resting voltage level to a lower voltage level, providing a pulse responsive to the zero crossing. This pulse is provided at zero-crossing detector output 22c to switch timing means first ON input 20b.

Switch timing means 20 utilizes a timer integrated circuit, such as the standard 7555 integrated circuit, and the like. The timer integrated circuit 62 is provided with operating potential V at a terminal 62-8, with respect to circuit common potential at another terminal 62-1. The trigger input terminal 62-2 is connected to first ON input 20b of the switch timing means, and receives the negative-going zero-crossing pulses from zero-crossing detector means 22. Responsive to each negative-going pulse applied to input 20b, an output terminal 62-3, connected to means output 20a, is set to a higher output voltage level. A threshold terminal 62-6 and a discharge terminal 62-7 are connected in parallel to switch timing means second OFF input 20c, while an adjustment terminal 62-5 is connected to switch timing means adjustment ADJ input 20e. The turn-off set means 26 comprises a timing capacitance 64 connected between output 26a, itself connected to switch timing means input 20c, and ground potential, and a timing resistance 66 connected between operating potential +V and the turn-off set means output 26a. If resistance 66 is made variable, as shown by the broken arrow therethrough, the resulting potentiometer acts as variable turn-off setting adjustment 26b. Thus, upon receiving the negative-going pulse at input 20b, the discharge terminal 62-7 releases the turn-off setting means terminal 26a from ground potential and the voltage thereat begins to exponentially increase toward operating voltage +V; when the voltage at terminals 26a and 26c reaches the threshold voltage set for terminal 62-6 (which threshold voltage is responsive to the voltage at ADJ terminal 62-5), the timer output terminal 62-3 is disabled and returned to a lower voltage level, disabling the switch timing means output 20a.

The drive turn-on and turn-off means are combined into a single drive on/off means 28, as more fully described and claimed in the aforementioned co-pending application Ser. No. 499,579. Briefly, drive means 28 includes a unidirectionally-conducting element, e.g. a diode 68, poled to conduct when drive means input 28a (connected to switch timing means output 20a) is at a higher voltage level. Therefore, at each source waveform zero crossing, the higher voltage level is applied through conducting diode 68 to the drive means output terminal 28b and the control input terminal 14a of the power switching means, turning on that one of switching devices 16a or 16b then having a positive potential at the drain thereof (dependent upon the polarity of the waveform half-cycle of the source connected between line terminals $L_1$ and $L_2$). When the switch timing means output 20a voltage level falls, the voltage at the output of an inverter 70 increases, turning on a first transistor 72 through a biasing network 74 (comprising a pair of resistances 74a and 74b and a temperature-compensation diode 74c) connected between the inverter output, the base of transistor 72 and ground potential. The current-source transistor 72 has its emitter electrode connected to a current-setting resistance 76 to common potential and its collector electrode connected both to the base electrode of an opposite-polarity second transistor 78 and to one terminal of a charging capacitance 80, having its other terminal connected to common circuit potential. The collector of transistor 78 is connected back to drive means input 28a, while its emitter electrode is connected to drive means output 28b. The junction between the emitter electrode of transistor 72 and the current-setting resistance 76 is connected to one terminal of each of a pair of resistance elements 82a and 82b, each having the remaining terminal thereof connected through a capacitance 84a or 84b, to first and second turn-off control terminals 28c and 28d, respectively. Each of terminals 28c and 28d is connected to the associated line terminal 14c or 14b, respectively, of the power switching means, to sense the rate-of-change of the instantaneous voltage thereacross. Drive means 28 thus provides for substantially instantaneous turning-on of power switching means 14 and a "soft" turning-off of power switching means 14, as more fully described in the aforementioned co-pending application. The "soft" turn-off of the power switching devices is utilized to obtain acceptable levels of line conducted electromagnetic interference and voltage overshoot with typical values of power line inductance, thus obviating the need for filters, snubbers and the like; the use of a fast-on/slow-off drive circuit may not be needed for a particular application, and is described herein only by way of illustration and not limitation.

If current limit means 30 is utilized, each of the pair of inputs 30a-1 and 30a-2 thereof is connected to one of the power switching means line terminals 14b or 14c, respectively. The forward-conduction voltage drop across the conducting one of the power switching devices 16a or 16b, appearing at the associated one of input terminals 30a-1 or 30a-2, is supplied to an inverting − input 86a of another comparator 86, through an associated one of a pair of limiting resistances 88a or 88b. Inverting input 86a is also connected to the anode of protection diode 90 having its cathode receiving positive operating potential +V, such that the comparator input 86a voltage never substantially exceeds the operating potential +V, even if the voltage across one of switching devices 16a and 16b has a magnitude exceeding the magnitude +V of the operating potential. A non-inverting + input 86b of second comparator 86 is connected to a fixed turn-off reference potential, as at the common junction between a pair of voltage divider resistance elements 92a and 92b connected in series between operating potential +V and the circuit common potential. A second comparator output 86c is connected to the current control means output 30b and thence to a first selectable terminal 94a of a selection means 94. The remaining selectable terminal 94b thereof is connected to operating potential +V, while the common terminal 94c is connected to switch timing means auxiliary input 20d. Selection means 94 may consist merely of a jumper connection 96d, wired between common terminal 94c and first selectable terminal 94a (as shown by the solid connection) if the current limit means is utilized, or fixedly connected (as shown by the broken connection) between second selectable terminal 94b and the common terminal 94c, to provide the operating potential +V continuously to terminal 62-4 of the time integrated circuit. Means 30 operates such that, if one of switching devices 16a or 16b is properly saturated, the voltage at second comparator input 86a is less than the reference potential established at the junction of reference divider resistances 92a and 92b, whereby the voltage at comparator output 86c, and therefore at timer integrated circuit terminal 62-4, is substantially at the operating potential +V level, allowing turn-off timing of the power switching means control input 14a signal to be controlled by turn-off set means 26 and the $V_{adj}$ signal level at input 20e. Whenever the forward-conduction voltage drop of the conducting switching devices 16a or 16b is of a magnitude providing input voltage exceeding the fixed reference potential, set by resistances 92a and 92b, the comparator output changes state, falling to a relatively low voltage and this low voltage state at timer integrated circuit terminal 62-4 resets the switch timing means output 20a to the relatively low voltage, or disabled, state, removing drive from, and turning off, power switching means 14. Thus, for a load 11 having a lower resistance at start-up, with respect to the normal "hot" operating resistance, the resetting of switch timing means output 20a will occur relatively soon after the setting thereof, due to the high in-rush current at initial turn-on and the time interval between setting and resetting of output 20a will gradually increase as the magnitude of the resistance $R_L$ of load 11 increases with time as the load tends toward steady-state conditions.

When steady-state conditions are reached, if current limit means 30 is utilized, or upon circuit enablement at closure of switch S if means 30 is not used, load voltage sampling means 32 and differential integrating means 34 operatively affect the action of switch timing means 20, in accordance with one principle of the present invention. Load voltage sampling means 32 includes a voltage divider means 100, including a series resistance 100a connected between the sampling means input 32a and a sampling common junction 100b, and a second divider resistance element 100c connected between divider output common junction 100b and circuit common potential. Divider means 100 serves to attenuate the peak line voltage magnitude to a voltage magnitude suitable for use with solid-state, and particularly integrated circuit, circuitry employed in differential integrator means 34. As previously described, the load voltage is sampled only during that portion of a designated-polarity, e.g. the positive-polarity, half-cycle portion of the source waveform, and only during such portion when one of the power switching devices, e.g. upper switching device 16a, is in the conductive condition. A first unidirectionally-conducting element 102, e.g. a semiconductor diode, is connected between the voltage divider common junction output 100b and circuit common potential and poled to conduct during the source waveform half-cycle of non-selected-polarity; in the illustrated example, the anode of diode 102 is at circuit common potential and the cathode is connected to sampling divider output 100b, such that diode 102 conducts substantially for the entire negative-polarity half-cycle of the source waveform, and provides a substantially short circuit of the reference divider output 100b to circuit common potential. In this manner, the load voltage sampling means output 32b is forced substantially to a zero level during the non-selected source waveform half-cycle. A second unidirectionally-conducting element 104, e.g. another semiconductor diode, is connected between the sampling divider output 100b and the sampling means second input 32c, itself connected to switch timing means output 20a; the maximum magnitude of the sampled voltage at the sampling divider output 100b is adjusted, by selection of resistances 100a and 100c, to never exceed the higher (power switching means enabling) level at timing means output 20a, such that diode 104 is reverse-biased whenever the switch timing means output 20a is at the higher voltage level for enabling one of power switching means devices 16 to conduct, and diode 104 is forward biased when the switch timing means output 20a voltage falls to a low, e.g. substantially circuit common, voltage level, for turning off the power switching means devices. Thus, the conductive, forward-biased diode 104 provides a substantially short circuit at sampling means output 32b whenever the power switching means is turned off. It will be seen that as power switching means 14 is enabled, by a higher voltage level at switch timing means 20a at the beginning of each positive-polarity half-cycle of the source waveform, diodes 102 and 104 are reverse-biased and the sampling means output 32b voltage $V_s$ increases proportional to the increase in the load voltage $V_L$. At that time during the source waveform positive-polarity half-cycle when the power switching means is turned off by the appearance of a lower voltage level at switch timing means output 20a, diode 104 is forward biased and forces the load voltage sensing means output 32b voltage to substantially the circuit common potential, until the end of the positive-polarity source waveform half-cycle. During the negative-polarity source waveform half-cycle, diode 104 is reversed-biased, but diode 102 is forward-biased and forces the load voltage sampling means output 32b voltage to continue at substantially the circuit common (zero) voltage level. Thus, the sampled voltage $V_s$ is at a non-zero level during voltage portions 42a and 42b (FIG. 1b) between time $t_0^+$ and time $t_1$, and is at a substantially zero magnitude for the entire remainder of the cycle.

Figure 1D:
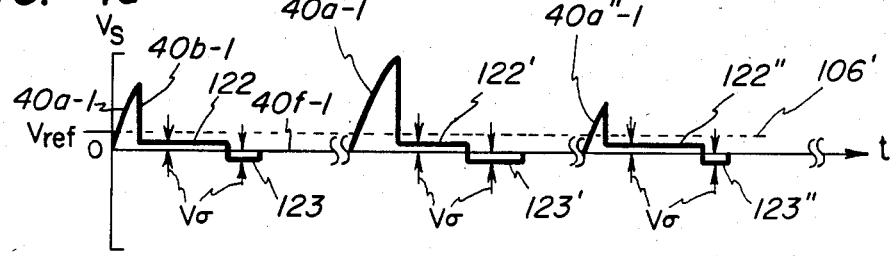

Differential integrating means 34 is utilized with a reference voltage setting means 106, including a resistive voltage divider comprised of a pair of series-connected resistance elements 106a and 106b, series connected between the operating potential +V source and circuit common potential, having an output 106d at the common junction therebetween at which the reference $V_{ref}$ potential is coupled to the reference voltage input 34b of the differential integrating means. The differential integrating means 34 itself comprises a differential-input operational amplifier 108 having an inverting − input 108a connected through an integration resistance 110 to the integrating means first input 34a. A non-inverting + input 108b is connected directly to the integrating means reference voltage input 34b. An integration capacitance element 112 is connected between inverting input 108a and the operational amplifier 108c, which output is connected through a resistance 114 to the integrating means output 34c and thence to the ADJ input 20e of the switch timing means. The voltage at operational amplifier output 108c is the time integral of the difference between the sampled voltage $V_s$ at first input 34a and the reference $V_{ref}$ voltage at second input 34b. The use of real (non-ideal) diodes 102 and 104 causes a small, but not insignificant, voltage drop $V_o$ to occur in sampling means output voltage $V_s'$, which is shown in FIG. 1d. Thus, during the load-current-conduction portion 40a-1 of the positive-polarity half-cycle, diodes 102 and 104 are reverse biased. The rapidly falling portion 40b-1 still occurs, but, because a real (non-ideal) diode 104 is utilized, the sampling voltage at sampling means output 32b never falls to zero. The differential integrator therefore sees an additional positive voltage portion 122 during the remainder of the positive-polarity source waveform half-cycle, and sees an additional negative voltage portion 123, of one diode voltage drop magnitude, during the portion of the negative-polarity source waveform half-cycle when diode 102 conducts. Thus, a curve portion 122 is present and has an area thereunder which, when integrated, changes the differential integrating means output voltage. It will be seen that the portions 122' and 123' or 122" and 123" appear whether the load voltage is greater than desired (the middle portion of FIG. 1d) or is lower than desired (the right-hand portion of FIG. 1d) and has an effect upon load voltage control.

The reference $V_{ref}$ voltage may be set by proper selection of the resistances of elements 106a and 106b, either of which can be made variable (or a separate potentiometer 100c used, as in FIG. 3) to facilitate changing and/or exactly setting the controlled load voltage magnitude. The integrator output 108d voltage is coupled to a point, at terminal 62-5, in a resistive divider chain extending between timer integrated circuit terminal 62-8 and 62-1, which sets the relative voltages at which the timer integrated circuit output terminal 62-3 voltage is enabled and disabled by the voltages at trigger input terminal 62-2 and the threshold terminal 62-6. The large pulsed voltage magnitude at trigger terminal 62-2 is sufficiently large as to always trigger the timer integrated circuit and enable the output 20a thereof. The primary effect of a change in integrator output 108c voltage is to cause a change in the time, after each zero-crossing enablement, at which turn-off set means timer output 20a and causes the load current $I_L$ to cease flowing, thus controlling the "average" MAD load voltage.

It will be seen that if the sampled voltage portion increases, as does the increased area under curve portion 40a'-1 (FIG. 1d), with respect to the area under curve portion 40a-1, the area integrated when the sampled voltage is less than the reference voltage level 106', then a decrease results in the integrator output 108c voltage (due to the inverting action of the integrator) and reduces the timing integrated circuit internal reference voltage for the voltage required at threshold terminal 62-6 to disable switch timing means output 20a; since the turn-off setting means voltage exponentially charges at the same rate, the lower threshold terminal 62-6 voltage is reached in less time, resulting in a decreased load current conduction period and a decreased load average MAD voltage. Conversely, in the low-load-voltage case (shown in the right-hand portion of FIGS. 1b–1d), the decreased area under sampled curve portion 40a"-1 causes the integrator output 108c voltage to increase. The increased voltage at ADJ terminal 62-5 raises the voltage level required at the threshold terminal 62-6 for disablement of the switch timing means output 20a; as the turn-off setting means output 26a voltage exponentially increases in the same manner, a longer time interval, after the output 20a enabling zero crossing, as required before output 20a is disabled; the load current flows for a longer time interval and the load voltage increases to begin compensating for the low sampled load voltage.

If current limit means 30 is utilized, the higher-priority out-of saturation condition detected by means 30 resets switch timing means output 20a to prevent over-dissipation damage to the power switching means 14 devices, even if the integrator output 108c voltage calls for a longer period of power switching means enablement. In this case, the load voltage is no longer controlled and rapidly decreases, so that load 11 is protected along with the protection to power switching means 14 afforded by the operation of current control means 30.

Figure 3E:
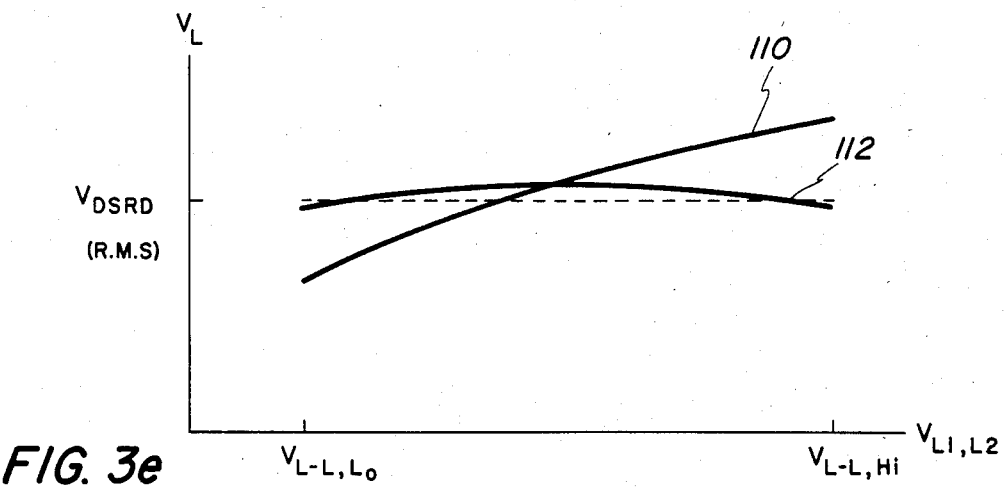
FIG. 3e is a graph illustrating the change in load voltage, for a change in source (line-to-line) voltage, for circuits controlling the MAD and RMS load voltage magnitudes, respectively.

Returning to FIG. 1c, it is often desirable to control the RMS voltage across the load, rather than controlling the MAD load voltage. While the MAD control circuit of FIG. 2 maintains a constant half-cycle average voltage, the load RMS voltage changes (FIG. 3e) over a rather wide range, indicated by curve 110, for variations between a line-line low voltage $V_{L-L,Lo}$, and a high line $V_{L-L,Hi}$, such as the 108–132 volts RMS range frequently encountered on residential power branch circuits. If it is desirable to control the load RMS voltage, the load RMS voltage $V_L$ should have a characteristic curve 112 more closely held to the desired load RMS voltage $V_{DSRD}$ over the entire normal line-line voltage range. Thus, it should be understood that the average MAD load voltage provides a substantially constant sampled voltage, as the MAD sample is a function of the sine of the source waveform frequency, while the RMS voltage varies as the square-to-the-sine of the source waveform voltage. Thus, as shown in the left-hand portion of FIG. 1c, the positive-polarity source waveform half-cycle current-conduction waveform 115 (shown in broken line) responsive to an increased source voltage, can be made to have the same area thereunder as the area under the lower source voltage waveform portion 40a, but the RMS value of load current and load voltage will be different for the different conduction portion waveforms 40a and 115.

The control of RMS load voltage is effected by utilization of a resistive element 120 (FIG. 3) in series with the conductive device shunting the resistance 100c of the sampling divider network. Resistance 120 changes the magnitude and waveform of the sampling means output voltage $V_s'$ over the more-than-half-cycle interval when such output voltage is a non-zero quantity, and thus affects the integrator $V_{adj}$ output voltage. This effect can be optimized for RMS load voltage control by removing the non-ideal effects of the elements causing the switching action in series with the additional sensing means resistance 120 and removal of any non-ideal switching element between the outputs of the sampling means output 32b and switch timing means output 20a (such as in diode 104). This modification has been carried out and is shown in the presently preferred RMS voltage control embodiment of FIG. 3.

In FIG. 3, wherein like reference designations are utilized for like elements, power switching means 14 utilizes a pair of power MOSFETs 16a' and 16b', as another illustration of the many forms of power switching devices which can be utilized.

The combined functions of diodes 102 and 104 are carried out by a controllable, bidirectionally-conductive switching element 126, having its controlled-conduction circuit connected between the RMS correction resistance 120 of the sensing means and ground potential, and having a control input 126a. An "exclusive-NOR" gate 128 has a first input 128a connected to a first additional input 32c' of the RMS load voltage sensing means, which input is connected to the output 20a of the switch timing means to provide the input information previously utilized with diode 104 (of the circuit of FIG. 2). A second gate input 128b is connected to a second additional RMS load voltage sensing means input 32b', connected to an auxiliary output 22'd providing a zero-crossing detection logic waveform $V_Z$ from the comparator output 52c. The gate output 128c provides the control signal $V_y$ for the control input 126a of the first bidirectional switching element 126.

If a current limit means is utilized, the modified limit means 30' may be used to provide, as more fully described and claimed in the aforementioned co-pending application Ser. No. 529,296, for alleviation of several temperature-related errors. This current limit means 30' utilizes a pair of comparators 86-1 and 86-2, each having the inverting — input 86-1a or 86-2a thereof connected to the reference voltage divider output junction and each having the non-inverting + input 86-1b or 86-2b thereof connected in series with the associated resistance 88a or 88b. A pair of controllable bidirectionally-conductive switching elements 130 and 132 are connected from common potential to the associated one of comparator inputs 86-1b and 86-2b. The control inputs 130a and 132a are connected in parallel to an auxiliary current limit means input 30'c, itself connected to an auxiliary drive means output 28'e. The auxiliary drive means output 28'e is connected to the output of inverter 70'. The comparator outputs 86-1c and 86-2c are respectively connected to a respective one of first and second inputs 134a and 134b of a third exclusive-NOR gate 134, having its output 134c connected sequentially to the current limit means output 30'b, the selection means 94 and thence to switch timing means input 20d. Inverter 70' is a fourth exclusive NOR gate, to accommodate standard TTL or CMOS logic integrated circuits, typically having four two-input exclusive-NOR gates, if a discrete component form of apparatus 10' is utilized. Similarly, diode 68 is replaced with a fourth controllable bidirectionally-conductive switching element 136, having a control input 136a connected to drive means input 28'a and a controlled-conduction channel connected between operating potential +V and the drive means output 28'b; the four bidirectionally-conductive switching elements 126, 130, 132 and 136 may also be physically housed in a single integrated circuit package if a discrete embodiment of circuit 10' is utilized. However, it is contemplated that substantially all of the elements of circuit 10' will be integrated into a single integrated circuit, in which the value of variable resistances, such as variable resistance 66, potentiometer 106c and the like, will be predeterminately established for a particular load. It is also contemplated that, dependent upon the load current and voltage characteristics, power switching means 14 may be provided as a separate entity in either discrete or integrated form, or may be inegrated with the remainder of circuit 10', if feasible. Similarly, it is within the scope of the present invention to similarly integrate the circuitry of apparatus 10 of FIG. 2, or other circuitry for filling the requirements of the circuit block diagram of FIG. 1.

Referring now to FIG. 3 and 3a-3d, apparatus 10' operates as follows: during each positive-polarity half-cycle portion 150a (shown in broken line of FIG. 3a) of the source voltage waveform, the comparator output 52c voltage $V_Z$ waveform is at a low, logic 0 level 152a, while during each negative-polarity half-cycle portion 150b of the source waveform, the voltage $V_Z$ at the zero-crossing detector auxiliary output 22'd is at a high, logic 1 level 152b. Responsive to each zero crossing 154, the drive means transmission gate 136 is turned on and the power switching means control input 14a voltage $V_g$ (FIG. 3b) rises substantially to the operating potential +V magnitude, with a relatively rapid leading edge portion 156. That one of switching device 16a' or 16b' then having a positive drain potential thereon, i.e. device 16a' during the positive-polarity half-cycle and device 16b' during the negative-polarity half-cycle, is placed in the conductive condition. At some time thereafter, prior to the next zero-crossing 154, the switch timing means output 20a voltage falls to a low level, responsive to the action of turn-off set means 26, as influenced by the integrator output 108c voltage only, if jumper 96b is used, or the $V_{adj}$ voltage and the current limit means output 30'b voltage, if jumper 96a is utilized. The disablement of switch timing means output 20a opens transmission gate 136 and causes the "slow turn-off" portion of drive means 20a' to operate, in the manner more fully discussed in the aforementioned co-pending application Ser. No. 499,599 and providing the characteristic turn-off waveform portion 158 for the trailing edge of each $V_g$, for which trailing edge the time scale has been magnified in FIG. 3b for purposes of illustration. Thus, during a first time interval $T_1$, the voltage $V_Z$ at the zero-crossing detector comparator output 22'd is at a logic 0 level while the switch timing means output 20a voltage is at a high, logic 1 level, providing the gate 128 output $V_y$ voltage at a logic 0 level, as shown in portion 160a of FIG. 3c. The load voltage sampling means output 32b' voltage $V_s'$ (FIG. 3d) therefore has a sinusoidally increasing initial portion 162 during time interval $T_1$. During time interval $T_1$, the sampling means output voltage $V_s'$ is given by the expression $V_s' = V_L R_c/(R_a + R_c)$ where $R_a$ and $R_c$ are the resistances of resistive elements 100a and 100b, respectively.

At the end of time interval $T_1$, the switch time means output 20a voltage is at a logic 0 level, as is the power switching means input voltage $V_g$, while the zero-crossing comparator output voltage $V_Z$ remains at a logic 0 level, causing the gate output voltage $V_y$ to rise to a logic 1 level and enable transmission gate 126 for conduction. Responsive to the logic 1 level 160b of the control input voltage $V_y$, the load voltage sampling means output $V_s'$ voltage falls, with trailing edge 164, to a lower, but non-zero, voltage level given by $V_s' = V_{L1-C}(R_d R_c)/(R_a R_d + R_d R_c + R_c R_a)$, where $R_d$ is the resistance of element 120c. An attenuated and non-zero portion 166 of the rest of the positive-polarity half-cycle source waveform 150a, after edge portion 164, continues to appear at the sampling means output 32'b until the negative-going zero crossing of the source waveform. During the source waveform negative-polarity half-cycle portion 150b (of FIG. 3a), the comparator output 52c changes to a high, logic 1 level and the auxiliary zero-crossing detector output 22'd voltage $V_Z$ is at the logic 1 level as shown in portions 152b. Responsive to the negative-going zero crossing, switch timing means 20 output 20a again rises to a high level, providing the rising edge 156' of the next power switching means enablement pulse. Both load voltage sensing means auxiliary inputs 32c' and 32b' receive a logic 1 level, whereby the gate control input 126a voltage $V_y$ continues to be provided at the logic 1 level of portion 160b. Gate 126 continues to conduct and the load voltage sampling means output $V_s'$ provides a negative-polarity portion 168 which is of an amplitude reduced by the same factor as the reduction of amplitude during portion 166, as resistance 120 is still connected essentially across resistance 100b by the enabled transmission gate 126. The resistance $R_d$ of resistor 120 is selected to make sampled voltage $V_s'$ equal to sampled voltage $V_s$ over the conduction portion of each source waveform cycle and for a constant load R.M.S. voltage. When the sampled voltage $V_s'$ at integrator first input 34a is compared to the reference voltage at integrator input 134b, the integrated area under positive-polarity portion 166 is greater than the integrated area under negative-polarity portion 168, and the difference in integrated differential voltage, i.e. the difference in area under each of the two portions 166 and 168, is dependent upon the line voltage, such that each area increases or decreases with the respective increase or decrease in line voltage, whereby the integrated adjustment output voltage $V_{adj}$ provided to switch timing means adjustment input 20e is substantially proportional to the time integral of the RMS load voltage deviation from the fixed reference voltage $V_{ref}$ set therefor.

At the end of the power switching means enabling pulse, i.e. after trailing edge 158' has fallen, during the negative-polarity source waveform half-cycle, the switch timing means output 20a voltage is at a low logic 0 level, while the zero-crossing detector auxiliary output 22'd voltage $V_Z$ remains at the high, logic 1 level in portion 152b. The control voltage $V_y$ at conduction element input 126a reverts to the logic 0 level, in portion 160c. This opens transmission gate 126 and removes resistance 120 from connection in parallel with resistance 100b. However, since there is no voltage at sampling means input 32a', for reasons explained hereinabove, the sample voltage $V_s'$ at load voltage sampling means output 32b' falls, with edge 170, to a substantially zero magnitude, as in portions 172, which is maintained until the start of the next positive-polarity source waveform half-cycle, whereat the entire process repeats. Thus, it is immaterial that transmission gate 126 is disabled in portion 160c, and this disablement has essentially no effect upon the RMS load voltage control process. Sampling means 32' and integrating means 34 still serve to increase the load current conduction, therefore increasing the load RMS voltage, if the integrated differential voltage during the previous source waveform cycle was responsive to a lower-than-desired load RMS voltage, and serves to decrease the load current conduction period, decreasing the load RMS voltage if the integration of the sample load voltage during the previous source waveform cycle was responsive to a higher-than-desired load RMS voltage. Therefore, by inclusion of the additional resistance 120, in the sampling means 32', with proper connection through transmission gate 126 to circuit common potential, the circuit performs in accordance with the desirable operating curve 112 (FIG. 3e) for changes over the broad range of source voltages, maintaining the RMS load voltage at a substantially constant level.

While several presently preferred embodiments of my novel method of, and apparatus for, load voltage control have been described in detail herein, many modifications and variations will now become apparent to those skilled in the art. It is my intent, therefore, to be limited only by the scope of the appending claims and not by the specific details and instrumentalities presented by way of illustrative example herein.

What I claim is:

1. A method for controlling a selected one of the half-cycle-average and RMS magnitude of an A.C. voltage applied across a load from a higher-magnitude A.C. source, comprising the steps of:
   (a) providing switching means connected in series between the source and the load for selectively completing the circuit therebetween;
   (b) enabling the switching means to allow a flow of current through the load for at least one time interval during each source A.C. waveform cycle;
   (c) sampling the magnitude of the voltage across the load once during only one half-cycle of each source waveform cycle to provide an adjustment signal; and
   (d) adjusting, responsive to the adjustment signal, the time interval during which the switching means allows the flow of load current to vary the selected one of the half-cycle-average and RMS load voltage magnitude to a value substantially equal to a desired value.

2. The method of claim 1, wherein step (c) further comprises the step of: sampling the line voltage magnitude as the load voltage only when load current flows.

3. The method of claim 2, further comprising the step of: sampling the load voltage magnitude only if a positive-polarity voltage is across the load during the flow of load current.

4. The method of claim 2, wherein sampling step (c) further comprises the steps of: providing a reference voltage with a magnitude establishing the desired one of the load voltage half-cycle-average and RMS magnitude; comparing the magnitudes of the sampled load voltage and the reference voltage; and integrating the difference between the sampled load and reference voltage magnitudes, with respect to time, to provide the adjustment signal.

5. A method for controlling the half-cycle-average magnitude of an A.C. voltage applied across a load from a higher magnitude A.C. source, comprising the steps of:
   (a) providing switching means connected in series between the source and the load for selectively completing the circuit therebetween;
   (b) enabling the switching means to allow a flow of current through the load for at least one time interval during each source A.C. waveform cycle;
   (c) sampling the magnitude of the voltage across the load at least once during each source waveform cycle to provide an adjustment signal; and
   (d) adjusting, responsive to the adjustment signal, the time interval during which the switching means allows the flow of load current to vary the mean-absolute-value of the load voltage magnitude to a value substantially equal to a desired value.

6. The method of claim 5, further comprising the step of: sampling the load voltage magnitude only if a positive-polarity voltage is across the load during the flow of load current.

7. The method of claim 1, wherein the root-mean-square magnitude of load voltage is controlled.

8. The method of claim 7, further comprising the step of: sampling a load terminal voltage during the entire portion, but less than all, of the source waveform cycle when one of the line terminals is connected to that load terminal.

9. The method of claim 1, further comprising the steps of: monitoring load conditions to detect at least one fault condition thereof; and immediately terminating the flow of load current if any of the at least one fault condition is detected.

10. The method of claim 9, wherein the at least one fault condition is a flow of load current exceeding a predetermined maximum value.

11. The method of claim 1, further comprising the step of: terminating the adjustment step for the present source waveform cycle if the time interval of load current flow exceeds a predetermined maximum duration.

12. Apparatus for controlling a selected one of the half-cycle-average and RMS magnitude of an A.C.

voltage applied across a load from a higher-magnitude A.C. source, comprising:
- switching means connected in series between the source and the load for selectively completing the circuit therebetween;
- means for enabling the switching means to allow a flow of current through the load for at least one time interval during each source A.C. waveform cycle; and
- means enabled by said enabling means for sampling the magnitude of the voltage appearing across the load during at least one time interval during only one half-cycle of each source waveform cycle when load current flows to provide an adjustment signal to said enabling means for adjusting the time interval during which said load current flows, to vary said selected one of said half-cycle-average and RMS load voltage magnitude to a value substantially equal to a desired value.

13. The apparatus of claim 12, wherein said sampling means further includes means for preventing sampling of said load voltage magnitude unless a positive-polarity voltage is present across the load during enablement of said sampling means by said enabling means.

14. The apparatus of claim 12, wherein said sampling means comprises: divider means for providing an output voltage which is a reduced-magnitude sample of the voltage then substantially across said load; means for providing a reference voltage having a magnitude establishing the desired one of the half-cycle-average and RMS load voltage magnitude; and means for integrating, with respect to time, the difference between the divider means output voltage and the reference voltage to provide said adjustment signal.

15. The apparatus of claim 14, wherein said reference voltage is a substantially-constant D.C. voltage.

16. The apparatus of claim 14, wherein said integrating means comprises: an operational amplifier having a non-inverting input receiving said reference voltage, an inverting input and an output at which said adjustment signal appears; an input resistance element receiving said divider means output voltage at a first terminal and having a second terminal connected to said inverting input; and an integrating element coupled between inverting input and said output.

17. The apparatus of claim 14, wherein the magnitude of the half-cycle-average voltage across said load is controlled, and said divider means further includes: first means, connected between said enabling means and the output of said divider means, for substantially disabling said divider means output signal if said enabling means is not then enabling said switching means for a flow of current through said load.

18. The apparatus of claim 17, wherein said first disabling means is a unidirectionally-conducting device poled to conduct only when said enabling means has disabled said switching means and load current does not flow.

19. The apparatus of claim 17, wherein said divider means further comprises: second means for substantially disabling said output signal if a negative-polarity voltage is present across said load.

20. The apparatus of claim 19, wherein said second disabling means is a unidirectionally-conducting device coupled between said divider means output and a common potential and poled to conduct if a negative-polarity voltage is present therebetween.

21. The apparatus of claim 14, wherein the magnitude of the RMS voltage across the load is controlled, and said divider means further includes: a resistance element connected between said output of said divider means and a common potential and having a magnitude selected to cause the magnitude of said adjustment signal to be responsive to the RMS magnitude of said load voltage; and means connected in series with said resistance element for disabling the connection thereof to said common potential (a) if said enabling means allows a load current flow with a positive-polarity load voltage, and (b) if said enabling means prevents a load current flow with a negative-polarity load voltage.

22. The apparatus of claim 21, wherein said apparatus includes means for detecting the polarity of said load voltage and for providing an output signal having first and second values, respectively, for respective negative-polarity and positive-polarity load voltages; said enabling means output signal provides first and second values respectively for respectively enabling and disabling said switching means; and the resistance-element-disconnecting means comprises an element having a control input and a circuit in series connection between said resistance and the common potential controlled to a bidirectionally-conductive condition responsive to a signal at said control input; and an exclusive-OR gate having a first input receiving said polarity-detecting means output, a second input receiving said enabling means output signal, and an output providing the control input signal.

23. The apparatus of claim 14, wherein said enabling means includes: means for disabling said switching means to terminate each occurrence of load current flow after a predetermined time interval if said adjustment signal has not yet caused load current flow termination.

24. The apparatus of claim 14, further comprising: means for monitoring load conditions to detect at least one fault condition thereof and for immediately terminating load current flow if any of the at least one fault condition is detected.

* * * * *